March 8, 1938. W. F. GROENE ET AL 2,110,266
CRANKSHAFT CHUCK
Filed April 13, 1937
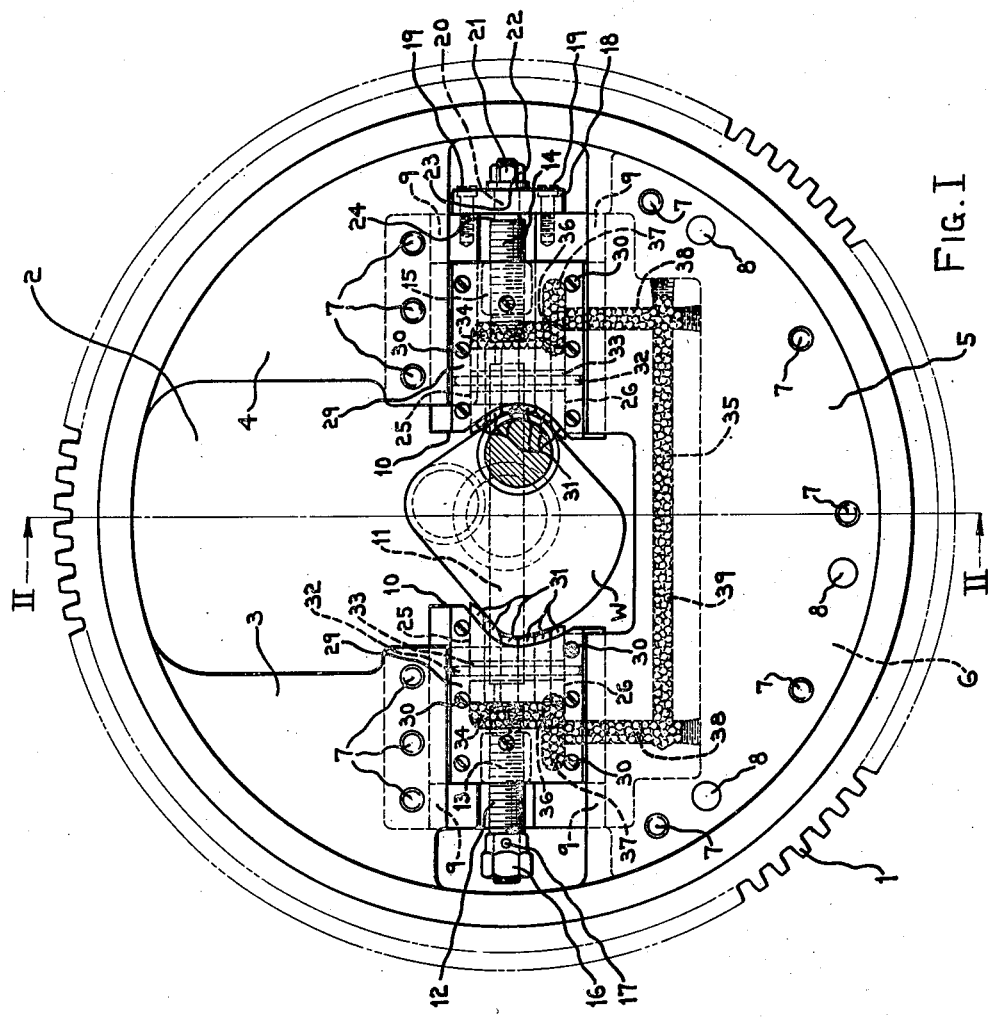
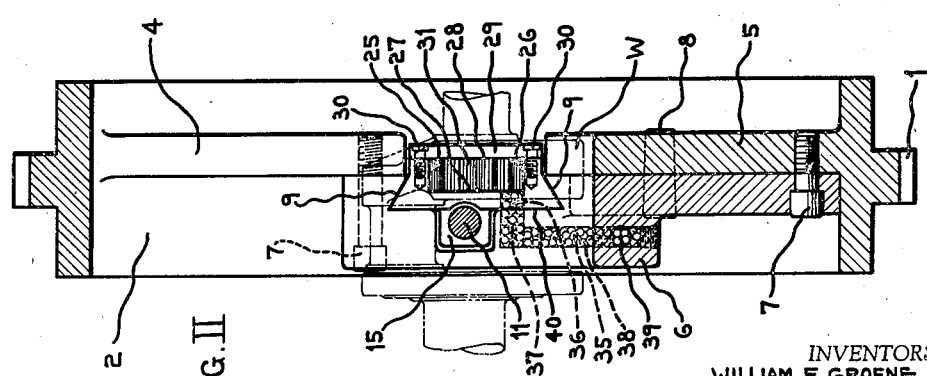
INVENTORS.
WILLIAM F. GROENE
HAROLD J. SIEKMANN
BY Willard L. Groene
ATTORNEY.

Patented Mar. 8, 1938

2,110,266

UNITED STATES PATENT OFFICE 2,110,266

CRANKSHAFT CHUCK

William F. Groene and Harold J. Siekmann, Cincinnati, Ohio, assignors to The R. K. Le Blond Machine Tool Company, Cincinnati, Ohio, a corporation of Delaware Application April 13, 1937, Serial No. 136,634

18 Claims. (Cl. 82—40)

This invention pertains to chucks for gripping irregular rough-surfaced work pieces which have been properly prelocated with respect to the axis of rotation of the chuck and which incorporates certain novel and improved features over chucking devices of a character shown in our copending application Serial Number 132,506 filed March 23, 1937.

The chief object of our invention is to provide a chuck which is adapted to engage a precentered and pre-indexed work piece in a lathe by means of rough irregular surfaces thereof in such a way as to securely support, locate, and drive said work piece while maintaining it at all times in its proper prelocated position.

A further object is to construct a chuck having a plurality of series of compensating plungers on the work spindle movable relative to each other whereby a rough surfaced prelocated work piece may be gripped between said series of plungers without distorting said work piece from its true prelocated position and which has means for automatically locking said series of plungers in engaged position on the work piece.

A further object is to provide in a chuck a pair of movable jaws having compensating plungers adapted to engage an irregular, prelocated work piece from opposite directions and to provide interconnecting means between said jaws whereby all of the plungers engage the work piece with equal force for securely holding the work piece in its proper prelocated position.

And still another object is to provide in a chuck having compensating plungers for engaging an irregular, prelocated work piece, only a single member which need be moved to fully chuck and unchuck the work and provide access to the chuck for loading and unloading the work piece therein.

And a still further object is to provide in a chuck a pair of jaws having compensating plungers adapted to engage an irregular, prelocated work piece in which the jaws move in opposite directions relative to the work piece along the same straight line for gripping or releasing said work piece.

Further objects will appear from a description of the drawing, in which:

Figure I is an axial view of the chuck shown gripping a rough, irregular web of a crankshaft.

Figure II is a transverse section through the chuck on the line II—II of Figure I.

Our invention is shown applied to a ring gear 1 of a center drive work spindle having an axial bore 2 through which work may be axially loaded into or out of the ring gear 1 manually, or by mechanical means, for example, as illustrated in Patent Number 1,700,721 issued January 29, 1929.

To the inner web comprising the portions 3, 4, and 5 formed integral with the ring gear 1 is fixed the frame 6 by appropriate screws 7 and dowel pins 8. Slidably mounted in appropriate dove-tail slots 9 are the jaws 10 for movement substantially radially of the axis of rotation of the ring gear 1. The jaws 10 may be moved to or from each other in the dove-tail slots 9 by means of the screw 11 which has a left hand thread 12 operating in a nut 13 formed integral with one of the jaws 10 and a right hand thread 14 operating in a nut 15 formed integral with the other jaw 10. A flatted-end member 16 fixed to the screw 11 by a suitable pin 17 provides means for rotating the screw 11 by applying a suitable wrench thereto.

Means is provided for approximately axially positioning the screw 11 relative to the ring gear 1 comprising the block 18 fixed on the frame 6 by screws 19 through which passes the end portion 20 having the nut 21 and washer 22 securely fixed thereon whereby the screw is allowed limited axial float between the faces of the block 18 and the face 23 of the collar 22 and the shoulder 24 of the screw 11, the purpose of which arrangement is to cause the jaws 10 to be maintained in proper operative relationship to the work piece or, in this particular example, the rough, irregular crankshaft web W.

In slots formed by the surfaces 25, 26, and 27 in the jaws 10 and by the surface 28 formed by the plate 29 secured to the jaws 10 by screws 30 is slidably mounted a series of compensating plungers 31 adapted to move parallel to the line of movement of the jaws 10 in slots 9. Retaining pins 32 fixed in the jaws 10 and passing through clearance holes 33 in each of the plungers 31 serve to retain them in the jaws 10 while at the same time providing ample freedom of movement of the plungers to allow their work contacting ends to properly engage the rough irregular surfaces of the periphery of the web W of the crankshaft. Behind the plungers 31 are chambers 34 containing a compensating pressure receiving medium such as hydraulic fluid, a semi-liquid, or metallic balls or shot 35 as shown in this particular exemplary embodiment.

Means are provided for allowing the pressure receiving medium 35 to flow between the chambers 34 in the jaws 10. In each jaw 10 is a passageway 36 which leads from the chamber 34 and opens into the elongated passageways 37 formed in the frame 6 whereby the chambers 34 are at all times connected into the passageways 37 for any position of their movement in the slots 9 in chucking or unchucking the work W. The elongated chambers 37 are at all times interconnected through the passageways 38 and 39 formed in the frame 6.

It can thus be seen that by appropriately rotating the screw 11 by applying a suitable wrench to the member 16 the jaws 10 may be brought toward the web W bringing the plungers 31 in contact with said web. Further tightening of the screw will cause all of the plungers 31 to bear against the web W with substantially equal force because of the inter-connection of the chambers 34 carrying the compensating pressure receiving medium 35. When the jaws 10 are thus clamped up on the work W the jaws and the screw 11 would have a certain amount of movement along the slots 9 and therefore the chuck would be unable to hold the work W from deflection under machining operations in this line. One way of overcoming such defects is to have the screw 11 in the block 18 so confined that it will have practically no axial float therein. Under these conditions the resistance to distortion of the work W along the line of movement of the jaws 10 in slots 9 is taken up entirely by the screw and the block 18.

Another arrangement is to allow the screw 11 limited axial movement in the block 18 as set forth above and to lock the jaws 10 to the frame 6 when plungers 31 have properly engaged the work W. This we accomplish automatically upon final tightening of the screw 11 by the interaction of pressure receiving medium 35 in the passageways 36 and 37. The medium 35 is of such a nature as to resist the shearing action caused by the passageways 36 moving outwardly along the elongated passageways 37, thereby preventing such outward movement of the jaws 10 upon their being fully clamped up on the work W.

There is also an additional action automatically set up upon final clamping of the jaws 10 about the work W which is caused by the action of the pressure medium 35 in the passageways 37 which exert pressure against the surfaces 40 of the jaws 10 to urge them upon final clamping up against the dove-tail slots 9 which sets up a wedging action between the jaws 10 and frame 6 to thereby securely automatically bind said jaws to the frame upon said final clamping up.

Having fully set forth and described our invention, what we claim as new and desire to secure by United States Letters Patent is:

1. A gripping device comprising jaws movable relative to each other, each of said jaws comprising individually movable gripping elements and a carrier means therefor, a chamber formed by portions of said gripping elements and of said carrier means, and a medium in said chamber, capable of adapting itself to all shapes of said chamber, acting as a rigid abutment, interconnecting means for the chambers to permit flow of said medium between said chambers, and means for automatically locking said jaws against movement.

2. A gripping device comprising jaws movable relative to each other, each of said jaws comprising individually movable gripping elements and a carrier means therefor, a chamber formed by portions of said gripping elements and of said carrier means, and a medium in said chamber, capable of adapting itself to all shapes of said chamber, acting as a rigid abutment, interconnecting means for the chambers to permit flow of said medium between said chambers, and means associated with said inter-connecting means for locking said jaws against movement.

3. A gripping device comprising jaws movable relative to a work piece to be gripped, each of said jaws comprising individually movable gripping plungers and a carrier means therefor, a chamber formed by portions of said gripping plungers and of said carrier means, and a medium in said chamber, capable of adapting itself to all shapes of said chamber, acting as a rigid abutment, interconnection means for the chambers to permit flow of said medium between said chambers, and means for automatically locking said jaws against movement when said plungers are fully engaged on said work piece.

4. A gripping device comprising jaws movable oppositely relative to each other in a straight line, each of said jaws comprising individually movable gripping elements and a carrier means therefor, a chamber formed by portions of said gripping elements and of said carrier means, and a medium in said chamber, capable of adapting itself to all shapes of said chamber, acting as a rigid abutment, and interconnecting means for the chambers to permit flow of said medium between said chambers.

5. A gripping device comprising jaws movable oppositely relative to each other in a straight line, each of said jaws comprising individually movable gripping plungers movable in said line and a carrier means therefor, a chamber formed by portions of said gripping plungers and of said carrier means, and a medium in said chamber, capable of adapting itself to all shapes of said chamber, acting as a rigid abutment, and interconnecting means for the chambers to permit flow of said medium between said chambers.

6. A gripping device comprising jaws movable oppositely relative to each other in a straight line, each of said jaws comprising individually movable gripping plungers movable in said line to engage a work piece to be gripped, a carrier means for said plungers, a chamber formed by portions of said gripping plungers and of said carrier means, and a medium in said chamber, capable of adapting itself to all shapes of said chamber, acting as a rigid abutment, interconnecting means for the chambers to permit flow of said medium between said chambers, and means associated with said interconnecting means to effect a locking of said jaws against movement when said plungers fully engage said work piece.

7. A gripping device comprising jaws movable oppositely relative to each other in a straight line to engage or disengage a work piece to be gripped, each of said jaws comprising individually movable gripping plungers to contact said work piece, a carrier means for said plungers, a chamber formed by portions of said gripping plungers and of said carrier means, and a medium in said chamber, capable of adapting itself to all shapes of said chamber, acting as a rigid abutment, and interconnecting means for the chambers to permit flow of said medium between said chambers whereby all of said plungers contact said work piece with equal force when said jaws are moved to engaging position on said work piece.

8. In a gripping device for holding an irregular prelocated work piece, a frame fixed relative to said work piece, a plurality of gripping jaws mounted in said frame adapted to engage said work piece, a single operable means mounted on said jaws for effecting engagement or disengagement of the jaws and the work piece, and means providing a limited relative movement of said single operable means and said frame.

9. In a gripping device for holding an irregular prelocated work piece, a frame fixed relative to said work piece, a plurality of gripping jaws mounted in said frame adapted to engage said work piece, a single operable means mounted on said jaws for effecting engagement or disengagement of the jaws and the work piece, means providing a limited relative movement of said single operable means and said frame, and means for locking said jaws to said frame.

10. In a gripping device, a frame, a pair of jaws oppositely slidable relative to an irregular prelocated work piece to be gripped, compensating plungers in said jaws each adapted to engage said work piece with substantially the same pressure, and means for arresting said compensating action of said plungers whereby said jaws may be locked to said frame.

11. In a crankshaft chuck, a rotatable work spindle, a pair of oppositely slidable jaws mounted on said spindle for movement relative to a rough irregular crankshaft web, a screw mounted on said jaws, means whereby said screw may be rotated to cause sliding of said jaws, and means cooperating with said screw whereby said jaws are maintained in proper operative relationship relative to said crankshaft web to be gripped.

12. In a crankshaft chuck, a rotatable work spindle, a pair of oppositely slidable jaws mounted on said spindle for movement relative to a rough irregular crankshaft web, a screw mounted on said jaws, means whereby said screw may be rotated to cause sliding of said jaws, compensating work engaging plungers mounted in said jaws, chambers formed by said jaws and said plungers, a medium in said chambers, capable of adapting itself to all shapes of said chambers acting as a rigid abutment, a passageway in said work spindle, and connections between said chambers and said passageway to permit flow of said medium between said chambers, said connections being adapted to prevent sliding of said jaws when said plungers have fully engaged with said crankshaft web.

13. In a crankshaft chuck, a rotatable work spindle, a pair of oppositely slidable jaws mounted on said spindle for movement relative to a rough irregular crankshaft web, a screw mounted on said jaws, means whereby said screw may be rotated to cause sliding of said jaws, compensating work engaging plungers mounted in said jaws, chambers formed by said jaws and said plungers, a medium in said chambers, capable of adapting itself to all shapes of said chambers, acting as a rigid abutment, a passageway in said work spindle, and connections between said chambers and said passageway to permit flow of said medium between said chambers, said connections being arranged to lock said jaws to said work spindle when said plungers have fully engaged said crankshaft web.

14. In a center drive chuck adapted to grip a rough irregular prelocated work piece, a ring gear adapted to axial loading, a pair of jaws having compensating plungers adapted to engage and support said work piece in proper prelocated position, and a single means for actuating said jaws for gripping said work piece and for withdrawing said jaws from said work piece for loading and unloading the chuck.

15. In a gripping device for holding an irregular prelocated work piece, a frame fixed relative to said work piece, a plurality of gripping jaws mounted in said frame adapted to engage said work piece, a single operable means mounted on said jaws and floatingly supported on said frame for effecting engagement or disengagement of the jaws and the work, and means for restricting the floating movement of said single means in said frame to predetermined limits.

16. In a gripping device for holding an irregular prelocated work piece, a frame fixed relative to said work piece, a plurality of gripping jaws mounted in said frame, gripping plungers in said jaws movable relative thereto, a single operable means mounted on said jaws and floatingly supported on said frame for moving said jaws relative to said work piece, and means for restricting the floating movement of said single means in said frame so as to maintain a predetermined relationship between said jaws and said plungers when in work gripping position.

17. In a gripping device for holding an irregular prelocated work piece, a frame fixed relative to said work piece, a plurality of gripping jaws mounted on said frame adapted to be moved simultaneously to and from said work piece, a single operable means mounted on said jaws and floatingly supported on said frame for effecting engagement or disengagement of the jaws and the work, and means for restricting the floating movement of said single means in said frame to predetermined limits.

18. In a gripping device for holding an irregular prelocated work piece, a frame fixed relative to said work piece, a plurality of gripping jaws mounted in said frame, gripping plungers in said jaws movable relative thereto, a single operable means mounted on said jaws and floatingly supported on said frame for simultaneously moving said jaws to and from said work piece, and means for restricting floating movement of said single means in said frame so as to maintain a predetermined relationship between said jaws and said plungers when in work gripping position.

WILLIAM F. GROENE.
HAROLD J. SIEKMANN.